DIGITAL DIFFERENTIAL ANALYZERS

Filed June 18, 1953 6 Sheets-Sheet 1

INVENTORS
RENO V. BENAGLIO
JACK M. PATTERSON
CHARLES A. PIPER
BY Ellsworth R. Roston
ATTORNEY INVENTORS
RENO V. BENAGLIO
JACK M. PATTERSON
CHARLES A. PIPER
BY Ellsworth R. Roston
ATTORNEY INVENTORS
RENO V. BENAGLIO
JACK M. PATTERSON
CHARLES A. PIPER
BY Ellsworth R. Roston
ATTORNEY

DIGITAL DIFFERENTIAL ANALYZERS

Filed June 18, 1953 6 Sheets-Sheet 4

INVENTORS
RENO V. BENAGLIO
JACK M. PATTERSON
CHARLES A. PIPER
BY
Ellsworth R. Roston
ATTORNEY INVENTORS
RENO V. BENAGLIO
JACK M. PATTERSON
CHARLES A. PIPER
BY
Ellsworth R. Roston
ATTORNEY INVENTORS
RENO V. BENAGLIO
JACK M. PATTERSON
CHARLES A. PIPER
BY
Ellsworth R. Roston
ATTORNEY United States Patent Office 2,900,135

Patented Aug. 18, 1959

2,900,135

DIGITAL DIFFERENTIAL ANALYZERS

Reno V. Benaglio, Birmingham, Jack M. Patterson, Berkley, and Charles A. Piper, Detroit, Mich., assignors to Bendix Aviation Corporation, Detroit, Mich., a corporation of Delaware Application June 18, 1953, Serial No. 362,584

10 Claims. (Cl. 235—152)

This invention relates to digital differential analyzers and more particularly to a system for enhancing the accuracy in the operation of digital differential analyzers in obtaining the solution of mathematical problems.

In co-pending application Serial No. 217,478 filed March 26, 1951, by Floyd G. Steele and William F. Collison, a digital differential analyzer is disclosed for solving complex differential equations by digital steps. The analyzer obtains the advantages of both the digital computers and the analog differential analyzers. The analyzer has the advantages of a digital computer in that it produces a quick and accurate solution of mathematical problems. The apparatus also includes the advantages of an analog differential analyzer in that it requires a minimum number of components to solve differential equations. The number of components are further reduced because of the logical system of component operation which has been incorporated into the machine. Because of these advantages, the analyzer requires only a relatively small space to obtain the solution of complex differential equations.

This invention provides apparatus which is included in the digital differential analyzer to enhance the accuracy of the solutions obtained by the analyzer. The apparatus operates with the analyzer to reduce by a factor of 2 the errors produced by the analyzer in the solution of many problems, and fairly often the apparatus operates to reduce the error by a factor substantially greater than 2. The apparatus is relatively simple and requires only a relatively small increase in the space occupied by the analyzer. The apparatus of the present invention provides a variation in the organization of a digital differential analyzer to enable either positive, negative or zero values as represented by signal indications. Because of this ternary method of indication, a digital differential analyzer is able to provide a determination on a ternary basis of the values of numerical quantities.

An object of this invention is to provide a system for operating in conjunction with a digital differential analyzer to minimize the errors produced by the analyzer in solving a problem.

Another object is to provide apparatus of the above character which can be easily incorporated in a digital differential analyzer to enhance the accuracies in the solutions obtained by the analyzer.

A further object is to provide apparatus of the above character which requires a minimum number of components so that only a relatively small increase is required in the size of the analyzer to obtain the benefits from the apparatus.

Other objects and advantages will be apparent from a detailed description of the invention and from the appended drawings and claims.

In the drawings:

Figure 8 is a chart illustrating the operation of certain of the components shown in Figures 1 to 3, inclusive.

Figure 1:
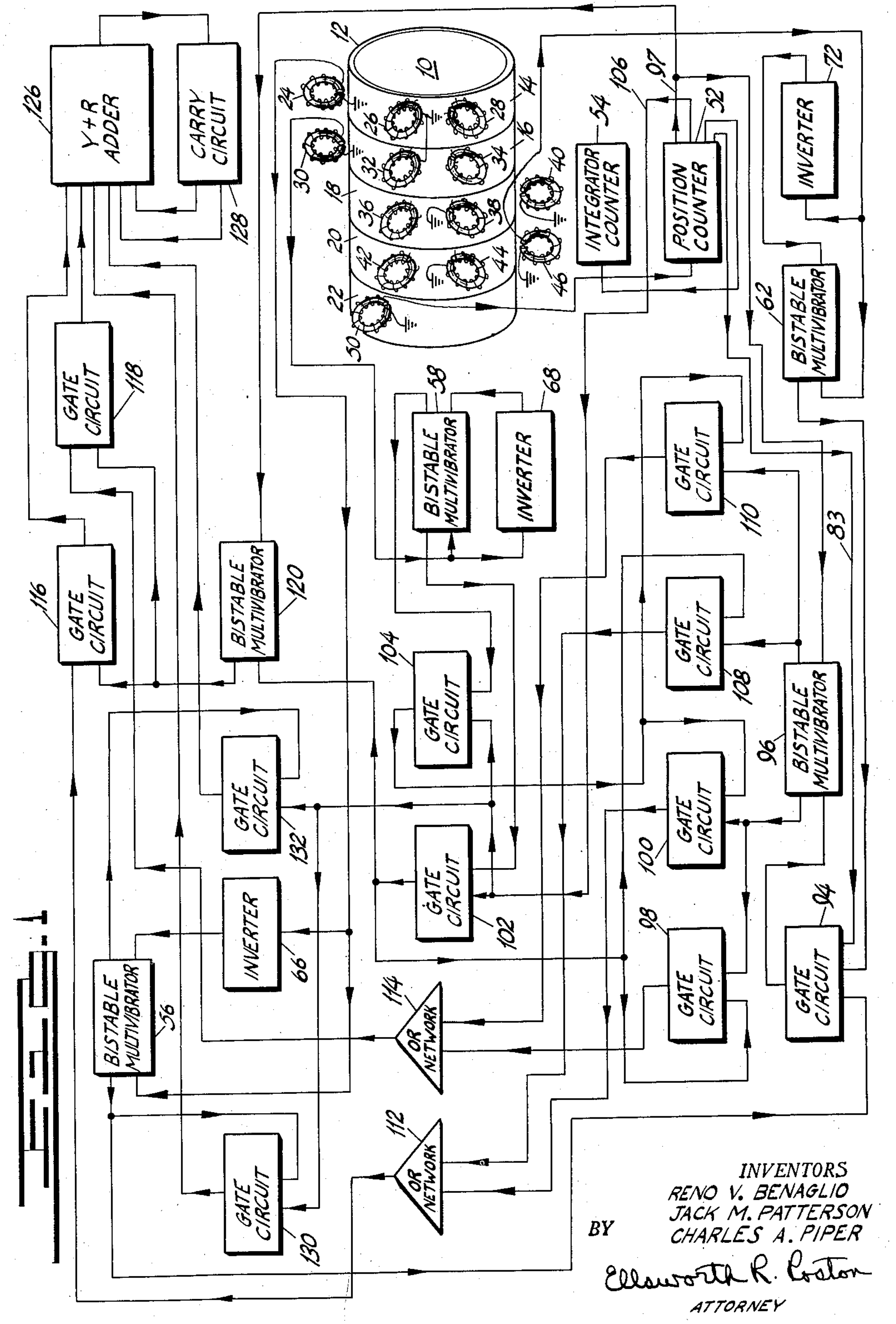
Figures 1, 2 and 3 are schematic diagrams, partly in block form and partly in perspective, showing the features which together constitute a digital differential analyzer and which operate in conjunction with the digital differential analyzer to form one embodiment of this invention.
Figure 2:
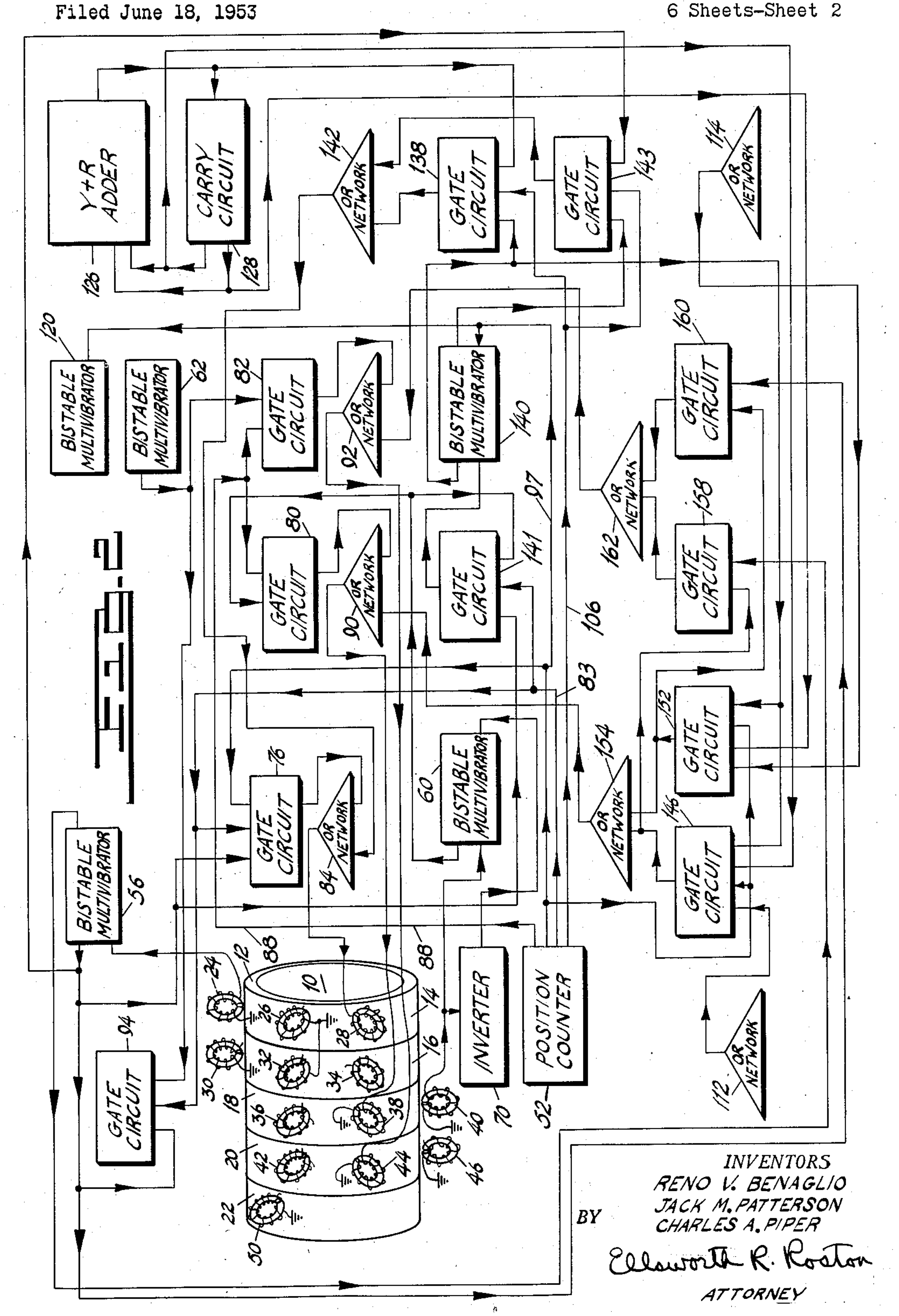
Figure 3:
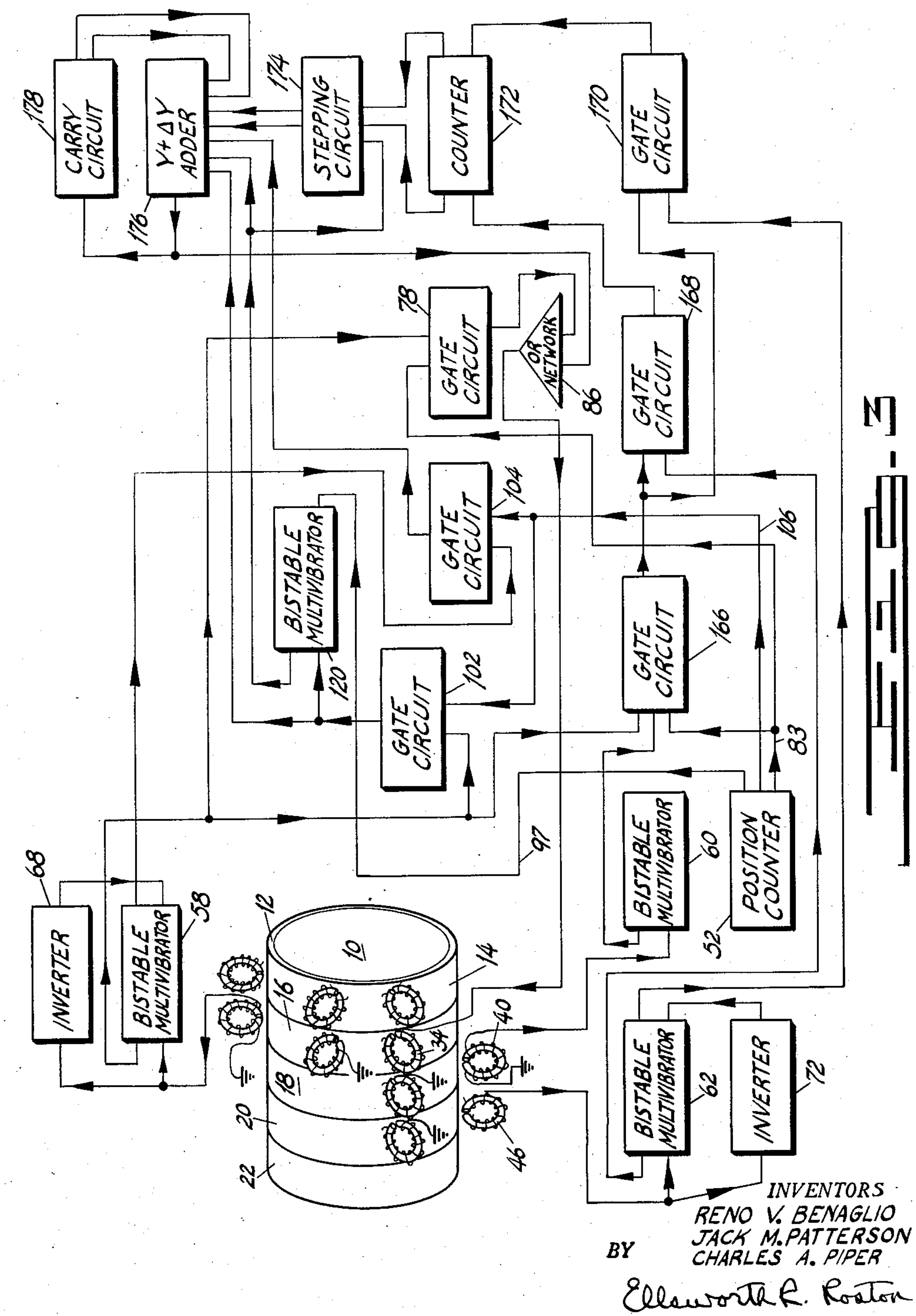

The digital differential analyzer shown in Figures 1 to 3, inclusive is adapted to solve differential problems by digital steps. The analyzer includes a drum 10 adapted to be rotated by a suitable motor (not shown). A thin coating 12 of magnetic material is applied to the periphery of the drum. The coating 12 can be considered as being divided into a plurality of annular channels 14, 16, 18, 20 and 22. Each of the channels is separated by a sufficient distance from its adjacent channels so as to be substantially unaffected by the magnetic information provided in the adjacent channels.

The circumferential distance of each channel may be considered as being divided into a plurality of positions. Each of the positions is sufficiently separated from its adjacent positions to receive a different magnetization than that provided on the adjacent positions. For example, approximately 1160 equally spaced pulse positions may be provided in each channel when the drum has a radius of approximately four inches.

A plurality of toroidal coils are positioned adjacent to each of the channels 14, 16, 18, 20 and 22. For example, coils 24, 26 and 28 are provided in contiguous relationship to the channel 14. Similarly, coils 30, 32 and 34; coils 36, 38 and 40; and coils 42, 44 and 46 are associated with the channels 16, 18 and 20, respectively. A single coil 50 is disposed adjacent the channel 22. Amplifiers (not shown) may be associated with each of the coils in the different channels.

The coils 24 and 28 are effectively separated from each other by approximately 104 pulse positions, and the coil 26 is disposed at an intermediate position between the coils 24 and 28. The coil 28 is adapted to provide signals in a pattern dependent upon the operation of the digital differential analyzer and to produce a corresponding magnetic pattern on the drum 10 as the drum rotates. The pattern produced on the drum 10 by the coil 28 is of the binary form in which a magnetization in one circumferential direction indicates one value and a magnetization in the other direction indicates a second value.

The coil 24 is adapted to pick up the changes in the direction of magnetization in the channel 14 as the drum rotates. The coil 26 is adapted to produce a substantially constant signal for returning the direction of magnetization on the drum to that representing a "0" value after the magnetic pattern on the drum has been converted into a corresponding electrical pattern by the coil 24.

The coils 30, 32 and 34 are separated from one another by distances corresponding to the distances between the coils 24, 26 and 28 and are adapted to perform functions similar to those performed by the coils 24, 26 and 28, respectively. The coils 38 and 44 are also adapted to operate in a manner similar to the coil 28 to provide a magnetic pattern in the channels 18 and 20, respectively, in a pattern dependent upon the problem to be solved.

The coils 38 and 44 are effectively separated from the coils 40 and 46, respectively, by approximately 49 pulse positions during the operation of the analyzer to obtain the solution of a mathematical problem. The coils 40 and 46 are adapted to produce signals in accordance with the magnetic pattern provided in their respective channels by the coils 38 and 44. The coils 36 and 42 are adapted to operate in a manner similar to the coil 26 to produce a constant "zero" direction of magnetization in the channels 18 and 20, respectively, after the pattern provided by the coils 38 and 44 have been utilized by the coils 40 and 46, respectively.

The coil 50 is adapted to produce a cycle of a signal approximating a sine wave as each pulse position in the channel 22 moves past the coil. The coil 50 produces a pattern of sine waves because of the magnetic pattern permanently provided in the channel 22. This pattern remains constant regardless of the problem to be solved.

A counter 52 is connected to the coil 50 to count the cycles of sine waves in the channel 22 as the drum 10 rotates. The counter 52 is formed from a plurality of multivibrators connected in cascade arrangement and is adapted to count successive sine waves in a numerical range from "1" to "48." Upon each count of "48," the counter 52 is adapted to return to its new state for the initiation of a new count. As will be disclosed in detail hereinafter, a new integrator is presented for computation upon the completion of each count of "48" by the counter 52. The counter 52 may be constructed in a manner similar to that shown in Figures 17 and 18 of the drawings and disclosed on pages 75 to 78, inclusive, of the specification for copending application Serial No. 217,478 filed March 26, 1951, by Floyd G. Steele and William F. Collison.

Similarly, a counter 54 is formed from a plurality of multivibrators in cascade arrangement. The counter 54 is connected to the counter 52 to count the number of times that a full count is obtained in the counter 52. For example, the counter 54 may count up to 22 full counts in the counter 52 before returning to its initial state for the initiation of a new count. In this way, the counter 54 divides the drum 10 into 22 integrators each having 48 pulse positions. The counter 54 may be constructed in a manner similar to that shown in Figures 24 and 25 of the drawings and disclosed on pages 83 to 85, inclusive, of the specification for copending application Serial No. 217,478.

The coils 24, 30, 40 and 46 are connected to the grids of the left tubes in bistable multivibrators 56 (Figure 1), 58, 60 (Figure 3) and 62, respectively. The bistable multivibrators 56, 58 and 60 are conventional circuits and may be constructed in a manner similar to that disclosed on page 51 of the specification for copending application Serial No. 217,478. Connections are also made from the coils 24, 30, 40 and 46 to the input terminals of inverters 66, 68, 70 and 72, the output terminals of which are connected to the grids of the right tubes in the multivibrators 56 (Figure 1), 58, 60 (Figure 3) and 62, respectively. The inverters 66, 68, 70 and 72 may be constructed in a manner similar to the first stage shown in Figure 9 of the drawings and disclosed on page 49 of the specification for copending application Serial No. 217,478.

Gate circuits 76 (Figure 2), 78 (Figure 3), 80 (Figure 2) and 82 are connected to the plates of the left tubes in the multivibrators 56, 58, 60 and 62, respectively. As will be disclosed in detail hereinafter, each of the gate circuits 76, 78, 80 and 82 operates to pass output signals only when all of its input terminals simultaneously receive relatively high voltages. In the computer terminology, gate circuits similar to the circuits 76, 78, 80 and 82 are known as "and" circuits or networks. For purposes of convenience, such circuits are shown as rectangles in the attached drawings. The gate circuits 76, 78, 80 and 82 may be constructed in a manner similar to that shown in Figure 11 of the drawings and disclosed on pages 56 and 57 of the specification for copending application Serial No. 217,478.

The gate circuits 76 (Figure 2) and 78 (Figure 3) are connected through a line 83 to an output terminal of the counter 52 so as to become open for the passage of information from the coils 24 and 30, respectively, only during the first 22 pulse positions of each integrator. The output signals from the gate circuits 76 and 78 are introduced to input terminals of networks 84 (Figure 2) and 86 (Figure 3), the output terminals of which are connected to the coils 28 and 34, respectively. Each of the networks 84 and 86 is adapted to pass output signals when relatively high voltages are introduced to any one of the input terminals in the network. In the computer terminology, networks similar to the networks 84 and 86 are designated as "or" networks. For purposes of convenience, such networks are illustrated as triangles in the attached drawings. The "or" networks 84 and 86 may be constructed in a manner similar to that shown in Figure 10 of the drawings and disclosed on pages 55 and 56 of the specification for copending application Serial No. 217,478.

In addition to being connected to the plates of the left tubes in the multivibrators 60 and 62, respectively, the gate circuits 80 and 82 (Figure 2) have input terminals connected through a line 88 to an output terminal of the counter 52. Because of their connection to the counter 52, the gate circuits 80 and 82 are adapted to become opened for the passage of information from the coils 40 and 46 during the first 47 pulse positions of each integrator coinciding to the pulse positions of an integrator storage section, which constitutes an arc on the drum 12, including several channels, used to provide the storage for an integrator. The output signals from the gate circuits 80 and 82 are introduced to "or" networks 90 and 92 having their output terminals connected to the coils 38 and 44, respectively.

A gate circuit 94 (Figure 1) has input terminals connected to the plates of the left tubes in the multivibrators 56 and 62. The gate circuit 94 also has an input terminal connected through the line 83 to an appropriate output terminal of the counter 52. The output from the gate circuit 94 is introduced to the grid of the left tube in a bistable multivibrator 96. The grid of the right tube in the multivibrator 96 is connected through a line 97 to an output terminal of the counter 52 such that the tube becomes cut off at the 48th pulse position of each integrator. The line 97 is also connected to an input terminal of the gate circuit 76 (Figure 2).

The plate of the left tube in the multivibrator 96 is connected to gate circuits 98 (Figure 1) and 100. A second input terminal of the gate circuit 98 also has voltage applied to it from the output terminal of a gate circuit 102, and a second input terminal of the gate circuit 100 has voltage applied to it from the output terminal of a gate circuit 104.

Input terminals of the gate circuit 102 are connected to the plate of the left tube in the multivibrator 58 and through a line 106 to an output terminal of the counter 52, so as to become opened after the 22nd pulse position for each integrator. Connections are made to input terminals of the gate circuit 104 from the plate of the right tube in the multivibrators 58 and from the line 106.

Similarly, the voltage on the plate of the right tube in the multivibrator 96 is introduced to input terminals of gate circuits 108 and 110. The gate circuits 108 and 110 also have input terminals which are connected to the output terminals of the gate circuits 102 and 104, respectively. Connections are made from the output terminals of the gate circuits 108 and 110 to input terminals of "or" networks 112 and 114, respectively. Voltages are also introduced to the networks 112 and 114 from the output terminals of gate circuits 100 and 98, respectively.

The output signals from the "or" networks 112 and 114 are introduced to input terminals of gate circuits 116 and 118, other input terminals of which are connected to the plate of the left tube in a bistable multivibrator 120. The operation of the left tube in the multivibrator 120 is controlled by a voltage introduced to its grid from the output terminal of the gate circuit 102. The voltage introduced to the grid of the right tube in the multivibrator 120 through the line 97 from the counter 52 controls the operation of the right multivibrator tube.

Connections are made from the output terminals of gate circuits 116 and 118 to input terminals of an adder 126. The adder 126 may be constructed in a manner similar to that shown in Figure 45 of the drawings and disclosed on pages 118 to 120, inculsive, of the specification for copending application Serial No. 217,478. Other input terminals of the adder 126 are connected to the output terminals of a carry circuit 128 and of gate circuits 130 and 132. The carry circuit 128 may be constructed in a manner similar to that shown in Figure 46 of the drawings and disclosed on pages 118 to 122, inclusive, of the specification for copending application Serial No. 217,478. The gate circuit 130 has signals introduced to it from the plate of the left tube in the multivibrator 56 and from the line 106 connected to the counter 52. Similarly, signals are introduced to the gate circuit 132 from the line 106 and from the plate of the right tube in the multivibrator 56.

The output signals from the adder 126 are introduced to an input terminal of a gate circuit 138 (Figure 2), which also has input terminals connected to the plate of the left tube in a multivibrator 140 and through the line 106 to the counter 52. The grid of the left tube in the multivibrator 140 is connected to the output terminal of a gate circuit 141, input terminals of which are connected to the plates of the left tubes in the multivibrators 56 and 60 and through the line 83 to the counter 52.

The output terminal of the gate circuit 138 is connetced to an input terminal of an "or" network 142 having it output terminal connected to the "or" network 84. A second input terminal of the "or" network 142 receives signals from a gate circuit 143, input terminals of which are connected to the plate of the left tube in the multivibrator 56, to the plate of the right tube in the multivibrator 140 and through the line 106 to the counter 52. The grid of the right tube in the multivibrator 140 is connected through the line 97 to an output terminal of the counter 52.

In addition to being applied to the adder 126, signals are also applied from the carry circuit 128 to a gate circuit 146. Connections are made to other input terminals of the gate circuit 146 from the plate of the left tube in the multivibrator 140, the output terminal of the "or" network 112 and through the line 97 from the position counter 52.

The output from the carry circuit 128 is also introduced to an input terminal of a gate circuit 152. Other input terminals of the gate circuit 152 are connected to the plate of the left tube in the multivibrator 140, the line 97, and the output terminal of the "or" network 114.

Connections are made from the output terminals of the gate circuits 146 and 152 to the input terminal of and "or" network 154, the output terminal of which is connected to the "or" network 90. The output terminals of the gate circuits 146 and 152 are also connected to input terminals of gate circuits 158 and 160, respectively, other input terminals of the gate circuits 158 and 160 being connected to the plates of the right and left tubes in the multivibrator 56, respectively. The output signals from the gate circuits 158 and 160 are connected to the input terminals of an "or" network 162, the output from which is applied to an input terminal of the "or" network 92.

In addition to its previously disclosed connections, the plate of the left tube in the multivibrator 58 is connected to an input terminal of a gate circuit 166 (Figure 3). Connections are made to other input terminals of the gate circuit 166 from the plate of the left tube in the multivibrator 60 and through the line 83 from the position counter 52. The output from the gate circuit 166 is applied to input terminals of gate circuits 168 and 170, other input terminals of which are connected to the plates of the left and right tubes in the multivibrator 62, respectively.

Connections are made from the output terminals of the gate circuits 168 and 170 to input terminals of a counter 172. The counter 172 is formed from a plurality of multivibrators connected in cascade arrangement to provide a resultant indication of a plurality of increments. The output terminals of the counter 172 are connected to the input terminals of a stepping circuit 174, the operation of which is initiated upon the introduction of a high voltage from the plate of the left tube in the multivibrator 120. The counter 172 and the stepping circuit 174 may be constructed in a manner similar to that shown in Figure 29 of the drawings and disclosed on pages 90 to 93, inclusive, of the specification for copending application Serial No. 217, 478.

The output signals from the stepping circuit 174 are introduced to an adder 176. The adder 176 may be constructed in a manner similar to that shown in Figure 38 of the drawings and disclosed on pages 108 and 109 of the specification for copending application Serial No. 217,478. Other signals are introduced to the adder 176 from the gate circuits 102 and 104, from a carry circuit 178 and from the plate of the left tube in the multivibrator 120. The output from the adder 176 is applied to input terminals of the carry circuit 178 and the "or" network 86. The carry circuit 178 may be constructed in a manner similar to that shown in Figure 39 of the drawings and pages 108 and 109 of the specification for copending application Serial No. 217,478.

The digital differential analyzer disclosed above is adapted to provide the solution of differential equations. For example, it may provide the solution for a general equation $y=f(x)$ so as to obtain a function $\int ydx=\int f(x)dx$, where $f(x)$ represents a function of $x$ and $\int f(x)dx$ represents the integral of the function. If a curve $y=f(x)$ is plotted with $x$ as the abscissa and $y$ as the ordinate, the analyzer obtains the relationship $\int ydx=\int f(x)dx$ by computing the area under the curve $y=f(x)$. By determining the area under the curve $y=f(x)$, the analyzer performs electronically operations that may sometimes be performed mentally by a skilled mathematician when the problem to be solved is relatively simple.

Figure 5:
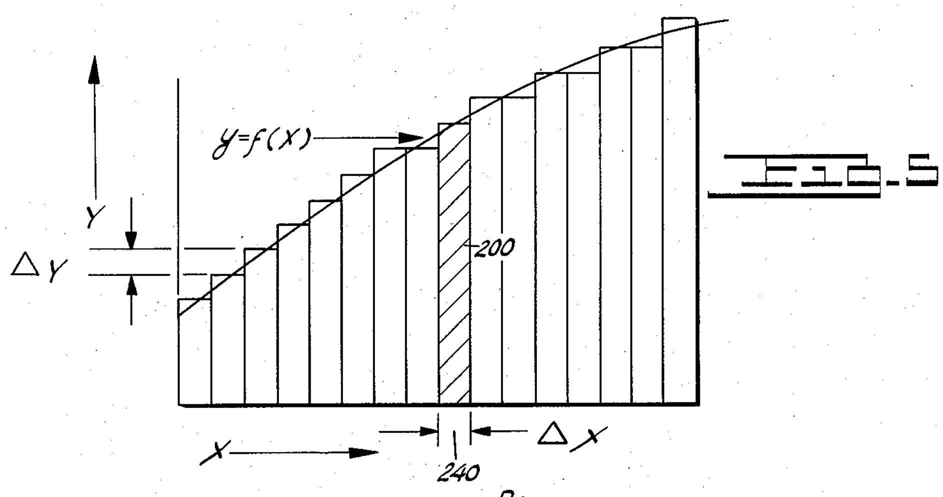
Figure 5 is a curve illustrating the operation of the integrator shown in Figure 4.

The analyzer obtains the value of the function $\int ydx=\int f(x)dx$ by producing small increments of $x$. These increments may be represented by the symbol $\Delta x$. For each $\Delta x$ increment, the analyzer determines the value of $y$ and obtains the product $y\Delta x$. This product $y\Delta x$ i.e. the differential combination of $y$ and $\Delta x$, represents the area under the curve $y=f(x)$ for each $\Delta x$ increment, as indicated in Figure 5 by the shaded area 200 for a particular $\Delta x$ increment. If the product $y\Delta x$ is obtained for successive $\Delta x$ increments and if all of the $y\Delta x$ increments are added together, the area under the integral of the curve representing $f(x)$ from $x_0$ to $x$ may be approximated. The approximation may be as close to the actual value as desired by decreasing the value of each $\Delta x$ increment.

Figure 4:
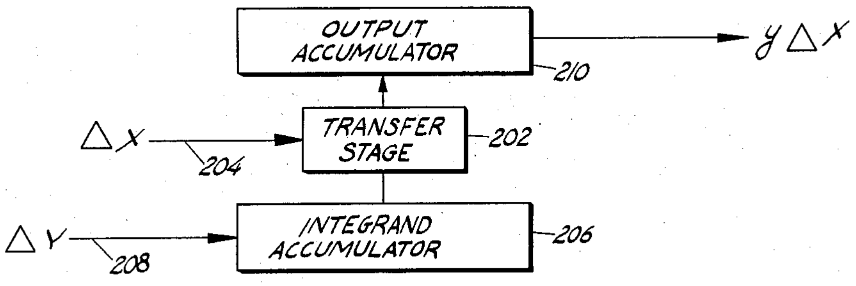
Figure 4 is a block diagram illustrating the operation of one of the integrators forming a part of the digital differential analyzer shown in the previous figures.

An integrator for determining the $y\Delta x$ increments and for storing the cumulative values of these increments is shown in Figure 4. The integrator includes a transfer stage 202 for obtaining $\Delta x$ increments at periodic intervals through a line 204. The transfer stage 202 is equivalent in one embodiment to the channel 14, the coils 24, 26 and 28 associated with the channel, the gate circuit 141, the bistable multivibrator 140 and other members and stages, as will become apparent hereinafter by detailed disclosure. The integrator also has an integrand accumulator 206 for storing the value of the dependent quantity $y$ and for receiving $\Delta y$ increments through a line 208 from its own and from other integrators so as to vary the value of $y$ in accordance with the function $y=f(x)$. The integrand accumulator 206 is equivalent in one embodiment to the channel 16, the coils 30, 32 and 34 associated with the channel, the gate circuits 166, 168 and 170, the counter 172 and stepping circuit 174, the adder 176, the carry circuit 178 and other members and stages, as will become apparent hereinafter by detailed disclosure. An output accumulator 210 is provided to receive $y\Delta x$ increments, to combine each $y\Delta x$ increment with the previous increments and to deliver the cumulative value obtained to another integrand accumulator or transfer stage while holding the remainder in store. The output accumulator is equivalent in one embodiment to the channel 14, the coils 24, 26 and 28, the gate circuits 98, 100, 108, 110, 116 and 118, the adder 126, the carry circuit 128 and other members and stages, as will become apparent hereinafter by detailed disclosure.

Figure 7:
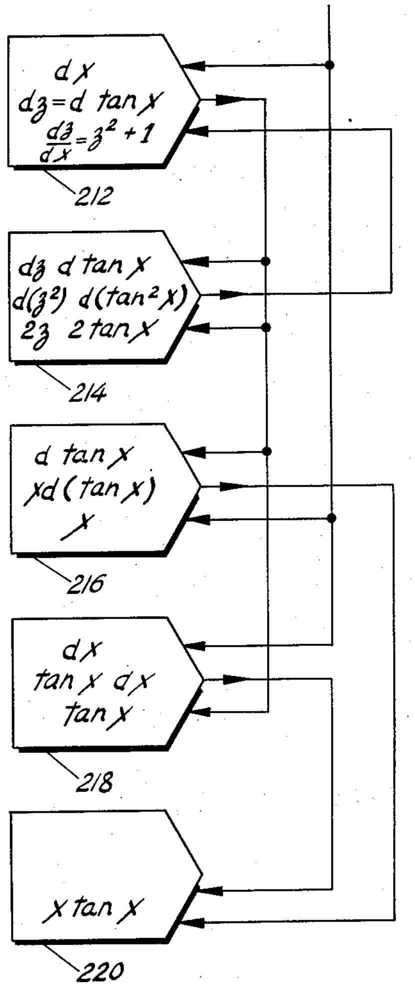
Figure 7 is a schematic diagram illustrating the relationship between different integrators forming the digital differential analyzer shown in Figures 1 to 3, inclusive, when the analyzer is solving a particular problem.
Figure 6:
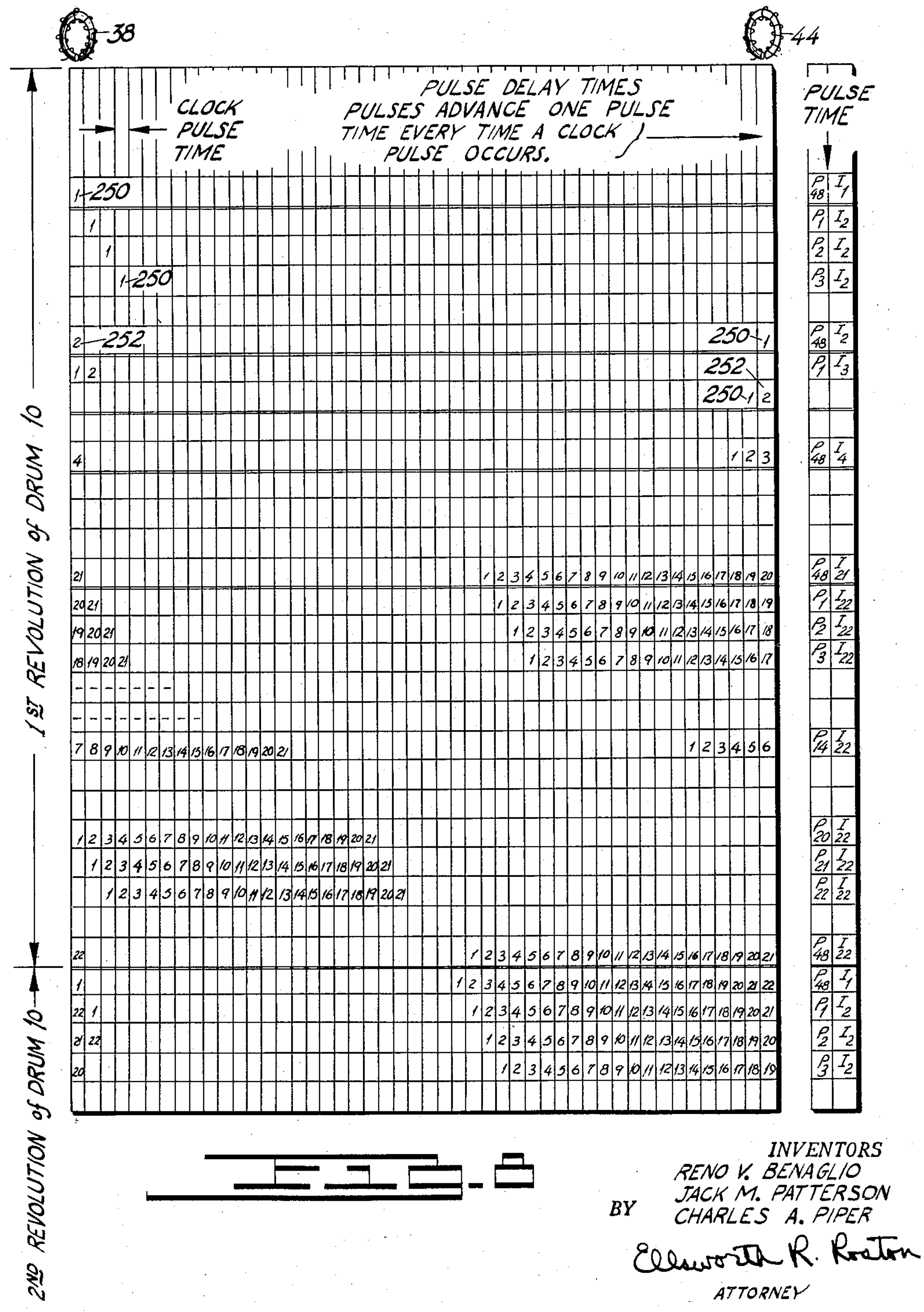

The interrelationship between different integrators is illustrated in Figure 7 for a particular problem represented by $$\frac{d^2y}{dx^2}=y^2+1$$

As is mathmetically known, the differential solution of this problem indicates that $y=\tan x$. The integrators involved in the solution of this problem are indicated in Figure 7 by blocks 212, 214 and 216. The integrators 218 and 220 are then utilized to obtain the function $\dot{x}\tan x$ from the function $\tan x$ generated by the integrators 212, 214 and 216. In each integrator, the introduction of the $\Delta x$ increments constituting the independent variable for the integrator is indicated by a line extending into the block at the upper right side of the block. The $\Delta y$ increments are introduced into the integrator through a line or a plurality of lines extending into the lower right portion of the block representing the integrator. The output of the integrator is obtained from a line extending from an intermediate position at the right side of the appropriate block.

As will be seen in Figure 7, $\Delta x$ increments of the independent variable for a particular integrator may be obtained from the output of another integrator. For example, in Figure 7, the $\Delta x$ increments for the integrators 214 and 216 are obtained from the output of the integrator 212. Similarly, $\Delta y$ increments for a particular integrator may be obtained from the output of other integrators as well as from the output of the integrator itself. For example, $\Delta y$ increments for the integrators 214 and 218 are obtained from the output of the integrator 212.

Figure 6:
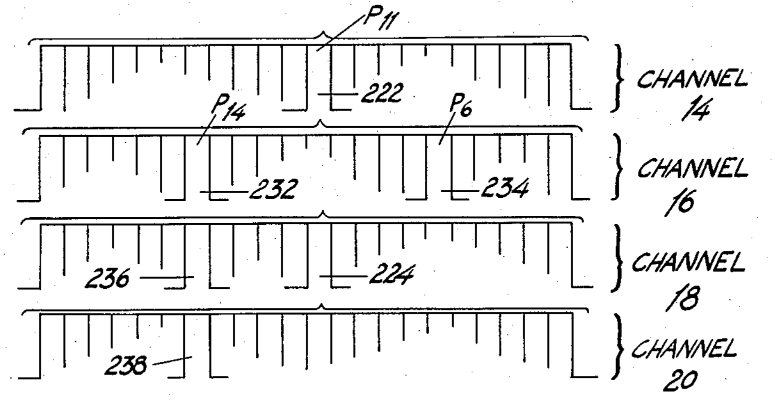
Figure 6 is a chart which illustrates how different parts of the integrator such as that shown in Figure 4 are coded to control the operation of the integrator.

The $\Delta x$ and $\Delta y$ increments for each integrator are actually determined from a coded pattern provided in an integrator storage section of the channels 14 and 16, respectively. As previously disclosed, the pulse positions in each channel are subdivided into 22 integrator storage sections each having 48 pulse positions. The first 22 positions in each integrator storage section in the channel 14 are coded to indicate a $\Delta x$ increment. Since the first 22 positions in the channel 14 for each integrator storage section correspond in number to the 22 integrators in the analyzer, the pulse representing a $\Delta x$ increment from each integrator storage section is recorded in a particular position in the channel 14. This position corresponds to the particular integrator from which the $\Delta x$ increments are obtained. For example, the $\Delta x$ increments for the integrator 214 in Figure 7 would be coded in a particular one of the 22 positions in the channel 14 corresponding to the time at which the output from the integrator 212 appears on the coils 40 and 46. In Figure 6, a pulse 222 is shown as being recorded in the channel 14 in the 11th pulse position for a particular integrator.

A pulse in the channel 14 in one of the first 22 positions for a particular integrator indicates that a $\Delta x$ increment may be made for the integrator. However, such a pulse does not indicate whether an increment will actually be made and, if so, whether the polarity of such increment will be positive or negative. The actual occurrence of a $\Delta x$ increment for the integrator is indicated by the presence or absence of a coincidental pulse in the channel 18. If a positive pulse is picked up from the channel 18 by the coil 40 at the same time as the pulse representing a possible $\Delta x$ increment for a particular integrator is picked up by the coil 24, a $\Delta x$ increment for the integrator actually occurs. For example, the pulse 222 in Figure 6 indicates an actual $\Delta x$ increment for a particular integrator since it coincides in time with a pulse 224 in the channel 18. A $\Delta x$ increment is not obtained for the integrator if a pulse does not appear in the channel 18 at the same time as the pulse in the channel 14.

The polarity of each $\Delta x$ increment is determined by the presence or absence of a coincidental pulse in the channel 20. If a pulse is picked up from the channel 20 by the coil 46 at the same time that pulses indicating an actual $\Delta x$ increment for a particular integrator are picked up by the coils 24 and 40, the $\Delta x$ increment for the integrator is positive. The $\Delta x$ increment is negative if a pulse does not appear in the channel 20 at the same time as the pulses in the channels 14 and 18. For example, the pulse 222 in Figure 6 indicates a negative $\Delta x$ increment since a pulse does not appear in the channel 20 simultaneously with the occurrence of the pulses 222 and 224 in the channels 14 and 18, respectively.

The first 22 positions in the channel 16 for each integrator storage section are coded to indicate $\Delta y$ increments in a manner similar to the coding of corresponding positions in the channel 14 to indicate $\Delta x$ increments. Since the first 22 positions in each integrator storage section correspond to the 22 integrators in the digital differential analyzer, each integrator is coded in particular ones of the first 22 positions in the channel 16 so as to receive the outputs from certain other integrators in accordance with the problem to be solved. For example, a pulse would be coded in the channel 16 in a particular one of the first 22 positions for the integrator 216 in Figure 7 so as to coincide with the time at which the output from the integrator 212 is made available to the coils 40 and 46 in the channels 18 and 20, respectively. Although only one $\Delta x$ increment can be obtained from an integrator storage section upon each revolution of the drum, several $\Delta y$ increments can be obtained. This may be seen by the pulses 232 and 234 in the channel 16 in Figure 6.

Each pulse in the first 22 positions in the channel 16 for each integrator represents the possibility of a $\Delta y$ increment but does not indicate the actual occurrence of such an increment or the polarity of the increment. The actual occurrence of the increment is indicated by the presence or absence of a pulse in the channel 18 at the same time that the pulse in the channel 16 is made available to the coil 30. For example, the pulse 232 in Figure 6 indicates an actual $\Delta y$ increment for a particular integrator since it coincides in time with a pulse 236 in the channel 18. However, no $\Delta y$ increment is obtained when the pulse 234 is picked up by the coil 30 since there is no coincidental pulse in the channel 18.

The sign of each actual $\Delta y$ increment is indicated by the presence or absence of a pulse in the channel 20 at the time that pulses in the channels 16 and 18 are simultaneously made available to the coils 30 and 40. For example, the pulse 232 in Figure 6 indicates a positive $\Delta y$ increment for a particular integrator since a pulse 238 appears in the channel 20 at the time that the pulses 232 and 236 are picked up by the coils 30 and 40, respectively.

Since the interrelationship between the different integrators remains constant during the solution of a particular problem, the coding pulses in the channels 14 and 16 for the first 22 positions of each integrator must be retained during the computation. Retention of the pulses in the channel 14 is provided by the multivibrator 56 (Figure 2), the gate circuit 76 and the "or" network 84. The pulses in the channel 14 having a particular direction of magnetization are converted by the coil 24 to pulses of relatively high voltage. These voltage pulses are then introduced to the grid of the left tube in the multivibrator 56 so as to cut off the tube. When the left tube in the multivibrator 56 becomes cut off, a high voltage is produced on the plate of the tube and is introduced to the gate circuit 76.

The gate circuit 76 is opened by a signal from the counter 52 when the first pulse from each integrator storage section is picked up by the coil 50. The gate circuit 76 remains open so that information in the channel 14 up to and including the 22nd pulse position of each integrator storage section can pass through the gate circuit. During the time that the gate circuit 76 remains open, the positive pulses from the plate of the left tube in the multivibrator 56 pass through the gate circuit to the "or" network 84. The network 84 in turn passes to the coil 28 any positive pulses introduced to it, and the coil 28 operates to produce a magnetic pattern in the channel 14 similar to that introduced to the network 84.

Similarly, the multivibrator 58 (Figure 3), the gate circuit 78 and the "or" network 86 operate to recirculate in the channel 16 the information provided in the first 22 positions of each integrator. As previously disclosed, pulses may be provided in the channel 16 in the first 22 pulse positions for each integrator to indicate whether any variations in the value of the dependent quantity $y$ will be made for the integrator.

Since the gate circuit 78 remains open during the first 22 positions for each integrator and since all of the $\Delta y$ increments for the integrator occur in the first 22 positions, all of the coding pulses controlling the production of the $\Delta y$ increments are retained for subsequent utilization. These coding pulses correspond to the pulses 232 and 234 in Figure 6 and control by their positioning the interrelationship between the dependent quantity for the integrator undergoing computation and the output quantities from certain of the integrators. This interrelationship is dependent upon the problem requiring solution, as may be seen in Figure 7 for a particular problem. In this way, each integrator can receive $\Delta y$ increments from a plurality of interrelated integrators in accordance with a problem to be solved.

The gate circuit 166 (Figure 3) operates to determine whether or not an actual $\Delta y$ increment is made for an integrator at the time that a coding pulse appears in the channel 16 in one of the first 22 pulse positions of an integrator storage section. The gate circuit 166 receives the coding pulses in the channel 16 because of its connection to the plate of the left tube in the multivibrator 58. The connection from the counter 52 through the line 83 to the gate circuit 166 causes the gate circuit to become open only during the first 22 positions of each integrator storage section. Since the gate circuit 166 is also connected to the plate of the left tube in the multivibrator 60, it can open for the passage of a signal only when high voltages are simultaneously produced on the plates of the left tubes in the multivibrators 58 and 60.

A relatively high voltage is produced on the plate of the left tube in the multivibrator 60 only when a relatively high voltage is induced in the coil 40. As will be disclosed in detail hereinafter, the coil 40 indicates in adjacent pulse positions the cumulative value of the successive $y\Delta x$ increments for each of the 22 integrators in the analyzer. The cumulative values of the $y\Delta x$ increments for the different integrators are made available by the coil 40 to each integrator to provide an indication of the $\Delta y$ increments for the integrator upon the presentation of the coinciding integrator storage section for computation. For example, $\Delta y$ increments for the integrators 214 and 218 in Figure 7 are obtained in accordance with the cumulative value in the channel 18 of the $y\Delta x$ increments of the integrator 212. The production of a pulse by the coil 40 at the same time as the appearance of a coding pulse in the channel 16 indicates only the occurrence of a $\Delta y$ increment, but it does not indicate whether such increment is positive or negative.

The pulses produced by the gate circuit 166 to indicate $\Delta y$ increments for the different integrators are introduced to the gate circuits 168 and 170. The gate circuit 168 also has a voltage introduced to it from the plate of the left tube in the multivibrator 62. This voltage is high when the left tube in the multivibrator 62 becomes cut off upon the introduction of positive pulses from the coil 46 to the grid of the tube. Positive pulses are induced in the coil 46 at the same time that the positive pulses in the channel 18 are induced in the coil 40. The simultaneous occurrence of pulses in the channels 18 and 20 indicates that the pulse in the channel 18 has a positive value.

When positive pulses are simultaneously introduced to the gate circuit 168 from the gate circuit 166 and the plate of the left tube in the multivibrator 62, the gate circuit 168 passes a signal to the counter 172. This signal causes the numerical indications provided by the counter 172 to increase by an integer in a positive direction. For example, a signal passing to the counter 172 from the gate circuit 168 may cause the counter to provide a numerical indication of $+4$ when an indication of $+3$ was previously provided by the counter. Similarly, the indications in the counter 172 may change from $-4$ to $-3$ upon the introduction of a signal from the gate circuit 168.

As previously disclosed, a positive increment in the cumulative $y\Delta x$ value for an integrator is indicated by the simultaneous occurrence of pulses of the same polarity in the channels 18 and 20. Similarly, a negative increment in the cumulative $y\Delta x$ value for the integrator is indicated by the simultaneous production of pulses of opposite polarity in the channels 18 and 20. Because of the particular polarity of the pulse in the channel 20, a relatively low voltage is induced in the coil 46. This voltage is inverted by the inverter 72 and is introduced as a relatively high voltage to the grid of the right tube in the multivibrator 62. This voltage causes the right tube in the multivibrator 62 to become cut off and a relatively high voltage to be produced on the plate of the tube.

When a relatively high voltage is produced on the plate of the right tube in the multivibrator 62 at the same time that a positive pulse passes through the gate circuit 166, the gate circuit 170 opens and passes a signal to the counter 172. This signal provides an indictation of a negative $\Delta y$ increment. Since the counter 172 is adapted to provide a negative count as well as a positive count of the $\Delta y$ increments, it operates upon the introduction of a signal from the gate circuit 170 to subtract an integer from the resultant value in the counter. For example, the indications in the counter 172 are changed from $+4$ to $+3$ when a signal is introduced to the counter from the gate circuit 170. Similarly, the counter 172 may provide an indication of $-5$ upon the introduction of a signal from the gate circuit 170 at a time when the counter has previously provided an indication of $-4$. The operation of a counter similar to the counter 172 in providing a positive and negative count of digital increments is fully disclosed in co-pending application Serial No. 217,478 filed March 26, 1951, by Floyd G. Steele and William F. Collison.

Since the counter 172 is formed from a plurality of multivibrators arranged in cascade relationship, the resultant value of the $\Delta y$ increment for each integrator is indicated in binary form. For example, with a resultant count of $+5$ for the $\Delta y$ increments for a particular integrator, the first and third multivibrators in the cascade arrangement may be operated to indicate a binary pattern of 101, where the least significant digit is at the right. In binary form, a pattern of 101 indicates that (1) $(2^2)+(0)$ $(2^1)+(1)$ $(2^0)=5$. Similarly, a value of +3 is indicated by a pattern of 011, where the least significant digit is at the right.

The resultant value of $\Delta y$ increments accumulated in the counter 172 for each integrator is made available on a step by step basis by the stepping circuit 174 which feeds the information sequentially into the adder 176. For example, when the resultant value of the $\Delta y$ increments for a particular integrator is +5, the circuit 174 indicates a value of +1 upon the rotation of the drum 10 past the pulse position which indicates the least significant digit of the number. This corresponds to the value of the least signficant digit in the binary indication of +5. As the drum rotates past the second and third pulse positions, the circuit 174 indicates values of 0 and 1, respectively. Similarly, for a $\Delta y$ increment of +3 for a particular integrator, the circuit 174 indicates successive values of 1, 1 and 0 as the drum 10 rotates through the pulse positions indicating the three least significant digits of the value of $y$ for the integrator. The operation of a stepping circuit similar to the circuit 174 and of an adder similar to the adder 176 is fully disclosed in co-pending application Serial No. 217,478.

The stepping circuit 174 operates to pass in sequence the binary indications in the counter 172 only during the time that a relatively high voltage is produced on the plate of the left tube in the multivibrator 120. The left tube in the multivbrator 120 is cut off upon the introduction of a signal from the gate circuit 102. The gate circuit is so connected to the counter 52 that it cannot open for the passage of a triggering signal until after the 22nd pulse position in the channel 16 for each integrator. When the first pulse appears in the channel 16 for an integrator after the initial 22 positions for the integrator, the gate circuit 102 is opened for the passage of a triggering signal to cut off the left tube in the multivibrator 120.

The production of a relatively high voltage on the plate of the left tube in the multivibrator 120 causes the adder 176 as well as the stepping circuit 174 to be triggered into operation. After the adder 176 has been triggered into operation, it receives binary indications of the value of the dependent quantity $y$ for each integrator and arithmetically combines these indications with the values of $\Delta y$ passing through the circuit 174. The adder 176 receives indications representing the integer "1" from the gate circuit 102 and indications representing the value "0" from the gate circuit 104. The operation of the gate circuits 102 and 104 is in turn controlled by the voltages on the plates of the left and right tubes in the multivibrator 58.

The arithmetical combination of the values of $y$ and $\Delta y$ are obtained for each pulse position in sequence as the drum 10 rotates. For example, the arithmetical combination of the indications of $y$ and $\Delta y$ in the 25th pulses position for a particular integrator may first be obtained. The arithmetical combination of the values of $y$ and $\Delta y$ may thereafter be sequentially obtained for the 26th, 27th and the following pulse positions for the integrator, e.g. the pulse positions in the channels constituting an integrator storage section.

Sometimes upon the arithemtical combination of the values of $y$ and $\Delta y$ for a particular pulse position, the adder 176 may obtain a full binary indication of +2. In binary form, an indication of +2 is equivalent to a value of zero for the pulse position and a carry of +1 to the next highest digit. For example, when a binary indication of +1 for $y$ in the 26th position is added to a binary indication of +1 for $\Delta y$ in the same position, the resultant value may be zero in the 26th position with a carry of +1 into the 27th position. This carry is provided by the circuit 178.

A carry may also be provided from a first pulse position to the next position when a carry from the position immediately preceding the first position is added to the integer "1" indicating the value of either $y$ or $\Delta y$ for the first position. For example, a carry may be provided from pulse position 29 to pulse position 30 as a result of an addition in pulse position 29. The addition of this carry indication with an integer "1" indicating the value of the dependent quantity $y$ for pulse position 30 causes a carry to be obtained for pulse position 31.

By arithmetically combining the values of $y$ from the multivibrator 58, the values of $\Delta y$ from the stepping circuit 174 and the carry indications from the circuit 178 for each pulse position, an new value of $y$ is obtained for each pulse position. The new indication of $y$ for each pulse position passes sequentially through the "or" network 86 and produces a corresponding signal pattern in the coil 34. This signal pattern causes the coil 34 to record in the channel 16 the new value of $y$ for each pulse position. The information relating to the new value of $y$ is subsequently utilized by the adder 176 as it moves past the coil 30 and it is thereafter erased by the coil 32.

The occurrence of each $\Delta x$ increment and the polarity of each such increment are determined in a manner similar to that disclosed above for the $\Delta y$ increments. Thus, a $\Delta x$ increment for an integrator occurs when a pulse of relatively high voltage is induced in the coil 40 at the instant that a pulse is induced in the coil 24 in one of the first 22 positions for the integrator. Similarly, the $\Delta x$ increment is positive when a pulse is induced in the coil 46 at the instant that the coding pulse for the integrator is induced in the coil 24. The $\Delta x$ increment is negative if a pulse is not induced in the coil 46 at the instant that the coding pulse for the integrator is induced in the coil 24.

As previously disclosed, the pulses induced in the coil 24 are introduced to the grid of the left tube in the multi-vibrator 56 (Figures 1 and 2) to cut off the tube in a pattern corresponding ot the pattern of magnetic pulses in the channel 14. The positive pulses produced on the plate of the left tube in the multivibrator 56 are introduced to the gate circuit 94. Since the gate circuit 94 is also connected through the line 83 to the counter 52, it is prepared to open for the passage of a signal during the first 22 pulse positions of each integrator. Because of its connection to the plate of the left tube in the multivibrator 62, the gate circuit becomes open only when a pulse appears in the channel 20 simultaneously with the appearance of the coding pulse in the channel 14. Such a simultaneous occurrence of pulses in the channels 14 and 20 for an integrator indicates that a $\Delta x$ increment for the integrator is positive.

Upon the passage of a signal through the gate circuit 94, the left tube in the multivibrator 96 (Figure 1) becomes cut off. The left tube in the multivibrator 96 remains cut off during the rest of the time that the particular integrator is presented for computation. At pulse position 48 of the integrator, a signal is introduced from the counter 52 through the line 97 to the grid of the right tube in the multivibrator 96 so as to cut off the tube. When the right tube in the multivibrator becomes cut off, the left tube starts to conduct. This causes the left tube in the multivibrator 96 to be prepared for triggering by a signal passing through the gate circuit 94 during the first 22 positions of the next integrator to be presented for computation.

When the left tube in the multivibrator 96 is cut off, a relatively high voltage is introduced from the plate of the tube to input terminals of the gate circuits 98 (Figure 1) and 100. The gate circuit 98 also receives signals from the gate circuit 102, which operates after the first 22 positions for each integrator to pass the pulses of relatively high voltage induced in the coil 30. As previously disclosed, these pulses provide an indication representing the integer "1" for different pulse positions in each integrator. Since each indication represents the dependent qauntity $y$ for each integrator, they may be designated as "Y" in conformity with the designations provided in co-pending application Serial No. 217,478.

When relatively high voltages are simultaneously introduced to the gate circuit 98 from the gate circuit 102 and the plate of the left tube in the multivibrator 96, the gate circuit passes a signal to the "or" network 114. Since the gate circuit 102 passes signals indicative of "Y" and the left tube in the multivibrator 96 indicates $+\Delta x$ when its voltage is high, each signal passing to the "or" network 114 indicates the value $(Y)(\Delta x)$ for a particular pulse position. The value $(Y)(\Delta x)$ is an "and" proposition which is true only when both Y and $\Delta x$ are simultaneously true. The value $(Y)(\Delta x)$ corresponds in binary form to the integer "1" for the pulse position.

For a value of "0" for a pulse position, a relatively low voltage is induced in the coil 30 at the pulse position. This low voltage is inverted by the inverter 68 and is introduced as a relatively high voltage to the grid of the right tube in the multivibrator 58 to cut off the tube. The resultant positive pulse on the plate of the right tube in the multivibrator 58 passes through the gate circuit 104. In this way, the pulses passing through the gate circuit 104 indicate the value of Y' for different pulse positions, where Y' is the inverse of the value of Y and indicates the integer "0" for the different pulse positions. This causes the signals passing through the gate circuit 100 to provide an indication of $(Y')(\Delta x)$ for the different pulse positions. These signals pass to the "or" network 112.

Since the left tube in the multivibrator 96 is triggered into a state of non-conductivity only for positive $\Delta x$ increments, the right tube in the multivibrator remains cut off for negative $\Delta x$ increments. When the $\Delta x$ increments are negative, a relatively high voltage is introduced from the plate of the right tube in the multivibrator 96 to the gate circuits 108 and 110. Because of its connection to the gate circuit 102, the gate circuit 108 passes signals only for those pulse positions when a relatively high voltage is induced in the coil 30. Thus the signals passing through the gate circuit 108 provided an indication of $(Y)(-\Delta x)$. As is well known, $(Y)(-\Delta x)$ is arithmetically equivalent to $(-Y)(\Delta x)$. As will be disclosed in detail hereinafter, $-Y$ is equivalent to $+Y'$. Thus the signals passing through the gate circuit 108 effectively provide an indication of $(Y')(\Delta x)$ and correspond to the signals passing through the gate circuit 100. The signals from the gate circuits 100 and 108 may be designated as $Y_a'$ in a manner similar to that disclosed in co-pending application Serial No. 217,478 and shown in Figures 45 and 46 of the co-pending application. These signals are introduced to the gate circuit 116 after passing through the "or" network 112.

In like manner, the signals passing through the gate circuit 110 provide an indication of $(Y)(-\Delta x)$. Since $Y'$ is equivalent to $-Y$ $$(Y')(-\Delta x)=(-Y)(-\Delta x)=(Y)(\Delta x)$$

Thus the signals passing through the gate circuit 110 correspond to the signals passing through the gate circuit 98 and provide an indication of a value designated as $Y_a$ in co-pending application Serial No. 217,478. The signals from the gate circuits 98 and 110 pass through the "or" network 114 to the gate circuit 118.

The gate circuits 116 and 118 become opened for the passage of signals only after the left tube in the multivibrator 120 has been triggered into a state of non-conductivity by the first pulse in the channel 16 after the 22nd pulse position for each integrator. Since this pulse indicates that the pulses which follow in the channel 16 represent the numerical value of the dependent quantity $y$ for the integrator, the gate circuits 116 and 118 pass information relating only to the numerical values of $Y_a'$ and $Y_a$, respectively.

The information passing through the gate circuits 116 and 118 is introduced to the adder 126. The adder 126 also receives information from the gate circuits 130 and 132, which pass the information appearing on the plates of the left and right tubes in the multivibrator 56 only after the 22nd pulse position for each integrator. Because of the connection from the coil 24 to the grid of the left tube in the multivibrator 56, the plate of the left tube in the multivibrator 56 indicates the integer "1" in the pulse positions in the channel 14 after the 22nd position for each integrator when the voltage on the plate of the tube is relatively high. Similarly, an indication of the integer "0" is provided on the plate of the right tube in the multivibrator 56 for the pulse positions after the 22nd pulse position for each integrator when the voltage on the plate of the tube is relatively high. As will be disclosed in detail hereinafter, the information provided in the channel 14 in the pulse positions after the 22nd pulse position for each integrator relates to the cumulative value of the differential combination $y\Delta x$ for the integrator. The indications of the integers "1" and "0" in the channel 14 after the 22nd pulse position for each integrator are respectively designated as R and R' in co-pending application Serial No. 217,478.

The adder 126 combines the indications of R and R' passing through the gate circuits 130 and 132, respectively, with the indications of $Y_a$ and $Y_a'$ passing through the gate circuits 116 and 118, respectively and with the carry information passing through the circuit 128. The circuit 128 operates in a manner similar to the circuit 178 (Figure 3) to provide a carry of an integer from one pulse position to the next when a value of +2 or +3 is obtained by addition in the first pulse position. For example, when the values $Y_a$ and R are added together for the 26th pulse position, the integer "1" is added to the integer "1" to obtain a full binary indication of +2. Since an indication of +2 is equivalent in binary form to a value of "0" for the pulse position and a carry of +1 to the next position, the circuit 128 (Figure 1) carries a value of 1 to the 27th position. This carry is arithmetically combined in the 27th pulse position with the indications passing through the gate circuits 116, 118, 130 and 132. In this way, a new value is obtained for each pulse position in the channel 14 after the 22nd pulse position for each integrator.

The operation of the adder 126 is similar to that disclosed in co-pending application Serial No. 217,478. As disclosed in the co-pending application and as shown in Figure 45 of the co-pending application, the adder 176 provides a relatively high voltage for a pulse position when $$Q=Y_aR_1'D_2'+Y_a'R_1D_2'+Y_a'R_1'D_2+Y_aR_1D_2$$

In the above equation, $D_2$ indicates a carry to one pulse position from the previous pulse position and $D_2'$ indicates the absence of a carry. Furthermore, Q indicates an arithmetical combination of the different quantities to produce a relatviely high voltage representing the integer "1" for each pulse position. The "+" sign indicates an "or" proposition such that Q is true when any one of the "and" propositions $Y_aR_1'D_2'$, $Y_a'R_1D_2'$, $Y_a'R_1'D_2$ or $Y_aR_1D_2$ is true.

Similarly, the integer "0" is obtained for a pulse position when $$Q'=Y_a'R_1'D_2'+Y_aR_1D_2'+Y_a'R_1D_2+Y_aR_1'D_2$$

In the above equation, Q' indicates the integer "0" since it is the inverse of Q.

The output from the adder 126 is introduced to the gate circuit 138 (Figure 2). Because of its connection through the line 106 to the counter 52, the gate circuit 138 is prepared for opening only after the 22nd pulse position for each integrator. The gate circuit becomes open for the passage of signals in these pulse positions only when relatively high voltages are simultaneously introduced to it from the adder 126 and the plate of the left tube in the multivibrator 140.

Because of the connection to the grid of the left tube in the multivibrator 140 from the gate circuit 141, the left tube in the multivibrator 140 becomes cut off only when an actual $\Delta x$ increment occurs for an integrator. The left tube in the multivibrator 140 becomes cut off only when an actual $\Delta x$ increment occurs, since the gate circuit 141 opens and passes a signal only upon the occurrence of an actual $\Delta x$ increment.

Since the gate circuit 141 is connected through the line 83 to the counter 52, it becomes prepared for opening only during the first 22 pulse positions of each integrator. The gate circuit also receives the pulses of relatively high voltage which are induced in the coil 24, since the gate circuit is connected to the plate of the left tube in the multivibrator 56. Such pulses include a coded indication in the first 22 pulse positions for each integrator that a $\Delta x$ increment may actually occur for the integrator.

The gate circuit 141 also receives the pulses of relatively high voltage appearing on the plate of the left tube in the multivibrator 60. As previously disclosed, the left tube in the multivibrator 60 is cut off in a pattern dependent upon the magnetic pulses appearing in the channel 18 and induced as electrical pulses in the coil 40. Each of the pulses in the channel 18 provides an indication of an actual $\Delta x$ increment for an integrator when it coincides with a pulse appearing in the channel 14 in one of the first 22 pulse positions for the integrator. Since the gate circuit 141 opens upon the simultaneous occurrence of pulses in the channels 14 and 18 during the first 22 pulse positions for each integrator, a signal passing through the gate circuit 141 for an integrator provides an indication that a $\Delta x$ increment has actually occurred for the integrator.

Upon the passage of a signal through the gate circuit 141, the left tube in the multivibrator 140 becomes cut off so as to prepare the gate circuit 138 for opening. The gate circuit 138 opens after the 22nd pulse position for each integrator and passes the information produced by the adder 126. This information passes through the "or" network 142 and the "or" network 84 for recordation by the coil 28 in the channel 14. In this way, a new indication is obtained for the cumulative value of the $y\Delta x$ increments for each integrator when a $\Delta x$ increment actually occurs for the integrator.

After the gate circuit 138 has been opened for the passage of information for a particular integrator, it remains open until the 48th pulse position for the integrator is presented for utilization. Upon the presentation of the 48th pulse position for the integrator, the gate circuit 138 closes because of its connection through the line 106 to the counter 52. After the gate circuit 138 has closed, the right tube in the multivibrator 140 is triggered into a state of non-conductivity as a result of a signal introduced to the grid of the tube through the line 97 from the counter 52.

When the right tube in the multivibrator 140 becomes cut off, the left tube starts to conduct and causes a relatively low voltage to be produced on its plate. This low voltage prevents any information from passing through the gate circuit 138 for the next integrator to be presented for computation unless an actual $\Delta x$ increment is obtained for that integrator. If an actual $\Delta x$ increment occurs for the integrator, a signal passes through the gate circuit 141 in a manner similar to that disclosed above and triggers the left tube in the multivibrator 140 into a state of non-conductivity.

As may be seen in Figure 5, a differential combination of $y\Delta x$ should be obtained only when an actual $\Delta x$ increment occurs. For example, a $y\Delta x$ increment indicated by the shaded area 200 in Figure 5 is obtained when an actual $\Delta x$ increment indicated at 240 occurs. If an actual $\Delta x$ increment does not occur for an integrator upon the presentation of the integrator for computation, the cumulative value of the $y\Delta x$ increments for the integrator should remain unchanged. This is accomplished in the analyzer constituting this invention by closing the gate circuit 138 (Figure 2) and opening the gate circuit 143 when a $\Delta x$ increment does not actually occur for an integrator.

As previously disclosed, the plate of the left tube in the multivibrator 140 continues to conduct when an actual $\Delta x$ increment does not occur for an integrator. The resultant relatively low voltage on the plate of the left tube in the multivibrator 140 prevents the gate circuit 138 from opening to pass the new information obtained by the adder 126. Since the right tube in the multivibrator 140 is cut off during the time that the left tube is conducting, a relatively high voltage is produced on the plate of the right multivibrator tube. This voltage is introduced to the gate circuit 143 to prepare the gate circuit for opening.

Because of the connection to the gate circuit 143 through the line 106 from the counter 52, the gate circuit is able to open only after the 22nd pulse position for each integrator. In this way, the pulses of relatively high voltage appearing on the plate of the left tube in the multivibrator 56 are able to pass through the gate circuit 143 after the 22nd pulse position for each integrator. Since voltage pulses are produced on the plate of the left tube in the multivibrator 56 in a pattern corresponding to that induced in the coil 24, the pulses appearing in the channel 14 are introduced to the gate circuit 143. This causes the pulses appearing in the channel 14 to pass through a circuit including the coil 24, the multivibrator 56, the gate circuit 143, the "or" networks 142 and 84 and the coil 28 after the 22nd pulse position for an integrator when a $\Delta x$ increment has not actually been obtained for the integrator. The pulses introduced to the coil 28 are recorded in the channel 14 and are subsequently presented again to the coil 24 for utilization.

The output from the carry circuit 128 is introduced to the gate circuit 146. Because of its connection through the line 97 to the counter 52, the gate circuit is prepared for opening only during the 48th pulse position of each integrator. In this way, the gate circuit is able to pass only a carry indication which is obtained by the arithmetical combination of the different values in the 47th pulse position for each integrator and which is carried to the 48th pulse position for the integrator. Since the gate circuit is connected to the plate of the left tube in the multivibrator 140, the gate circuit can open in pulse position 48 for an integrator only when a $\Delta x$ increment has actually occurred for the integrator.

The gate circuit 146 is also connected to the output terminal of the "or" network 112. As a result of this connection, a carry signal from the circuit 128 is able to pass through the gate circuit 146 in the 48th pulse position for an integrator only when the value of $Y_a$ is positive. When $Y_a$ is positive for an integrator, it is added directly into the value of the cumulative $y\Delta x$ increments provided in the channel 14 for the integrator. In this way, only a positive overflow can be obtained in the cumulative $y\Delta x$ value for the integrator, and this overflow is indicated by a pulse from the carry circuit 128.

The operation of the gate circuit 146 may be seen more clearly by reference to a particular example. For example, if a positive decimal number such as 596 is indicated in binary form in the channel 14 for a particular integrator and if the maximum indication that can be provided is 600, the addition of a value of +6 representing the value of $Y_a$ causes the indication in the channel 14 to return to a decimal value of +2. At the same time, the adder 126 produces a pulse for carry from the 47th position to the 48th position for the particular integrator, and this carry pulse passes through the circuit 128. Since the value of $Y_a$ is positive, the carry pulse then passes through the gate circuit 146 to indicate an overflow in the cumulative $y\Delta x$ value provided in the channel 14 for the integrator.

Because of the binary indications in the channel 14, a full indication in the cumulative $y\Delta x$ value for an integrator is provided by a pulse in the channel 14 in each of the pulse positions representing the cumulative value of $y\Delta x$ for the integrator. As a result, an overflow in the cumulative $y\Delta x$ value for an integrator is obtained only after a pulse of relatively high intensity simultaneously appears in each pulse position representing the cumulative value of $y\Delta x$ for the integrator. Upon an overflow, the indications in the channel 14 for the integrator return to a relatively low intensity for each pulse position to indicate the integer "0" for each pulse position. Subsequent additions of the positive $Y_a$ indications for an integrator cause the indications in the channel 14 for the integrator to increase in value.

The output from the gate circuit 146 is applied through the "or" networks 154 and 90 to the coil 38 and is recorded by the coil 38 in the channel 18. Since the gate circuit 146 passes only a signal for each integrator to indicate that an overflow has occurred in the cumulative $y\Delta x$ value stored in the channel 14 for the integrator, the channel 18 indicates in different pulse positions whether or not an overflow has occurred for each integrator the last time that the integrator was presented for computation. The operation of the channel 18 to present the overflow information for the different integrators will be disclosed in detail hereinafter.

The output from the gate circuit 146 is also introduced to the gate circuit 158. The gate circuit 158 also has a voltage introduced to it from the plate of the right tube in the multivibrator 56. This causes the signal from the gate circuit 146 to pass through the gate circuit 158 only when a relatively high voltage is simultaneously introduced to the gate circuit 158 from the plate of the right tube in the multivibrator 56. As previously disclosed, the voltage on the plate of the right tube in the multivibrator becomes relatively high for different pulse positions to indicate the value "0" for the positions.

As disclosed in co-pending application Serial No. 217,478, the 48th pulse position for each integrator in the channel 14 is utilized to provide a code as to whether or not the cumulative $y\Delta x$ value stored in the channel 14 for the integrator is to be inverted in polarity. This code is provided in the channel 14 in pulse position 48 for each integrator at the beginning of a problem and is recirculated through the gate circuit 76 and the "or" network 84 during the actual computation. The recirculation occurs because of the connection to the gate circuit 76 from the counter 52 through the line 97. In this way, the coded information in pulse position 48 for each integrator is made available to the integrator every time that the integrator is presented for computation during the actual solution of a problem.

In co-pending application Serial No. 217,478, a pulse is provided in the channel 14 in pulse position 48 for an integrator when the cumulative $y\Delta x$ value stored in the channel 14 for the integrator is to be inverted in polarity. The cumulative $y\Delta x$ value stored in the channel 14 for an integrator is to be maintained in the same polarity when a pulse is not provided in the channel 14 for the integrator. A similar coding is provided in this embodiment of the invention.

In the invention disclosed herein, the gate circuit 158 opens for the passage of a pulse from the gate circuit 146 for an integrator when the cumulative $y\Delta x$ value for the integrator is positive, as indicated by the absence of a pulse in the channel 14 in pulse position 48 for the integrator. As previously disclosed, the gate circuit 146 passes a carry pulse from the circuit 128 only when a carry occurs upon the addition of positive $Y_a$ values into the adder 126. Since the $Y_a$ value is positive and since the R value stored in the channel 14 is to be maintained in the same polarity, the gate circuit 158 passes a signal to indicate that the overflow for an integrator is positive. The signals passing through the gate circuit 158 pass through the "or" networks 162 and 92 to the coil 44 for recordation by the coil 44 in the channel 20. In this way, the pulses appearing in the channel 20 provide an indication of a positive overflow in the cumulative $y\Delta x$ value for an integrator when a pulse appears at the same time in the channel 18 to indicate that an overflow has actually occurred.

The output from the carry circuit 128 is also introduced to the gate circuit 152. The output is introduced to the gate circuit 152 through a line which causes the carry indications from the circuit 128 to appear as pulses of relatively low voltage and the absence of carry indications to appear as pulses of relatively high voltage. Because of the inversion of the output from the gate circuit 128, the gate circuit 152 can open only when a relatively low ouput indicative of the integer "0" is provided by the carry circuit 128.

The gate circuit 152 can open only at the 48th pulse position for each integrator since it is connected through the line 97 to the counter 52. Furthermore, the gate circuit 152 can open at the 48th pulse position for an integrator only when a $\Delta x$ increment has actually been obtained for the integrator. This results from the connection between the gate circuit and the plate of the left tube in the multivibrator 140.

Because of its connection to the "or" network 114, the gate circuit 152 opens at the 48th pulse position for an integrator only when the value $Y_a'$ appears for the integrator. When the gate circuit 152 opens, a signal passes through it and through the "or" networks 154 and 90 to the coil 38 for recordation by the coil 38 in the channel 18. The passage of a signal through the gate circuit 152 provides an indication that an overflow has occurred in the cumulative $y\Delta x$ value stored for the integrator in the channel 14. In this respect, the gate circuit 152 operates in a manner similar to the gate circuit 146.

As previously disclosed, the term $Y_a'$ is indicated by the equaltion $Y_a'=(-Y)(\Delta x)+(Y)(-\Delta x)$. As may be seen by either the expression $(Y)(-\Delta x)$ or the expression $(-Y)(\Delta x)$, the term $Y_a'$ for an integrator indicates that a negative number is being introduced to the adder 126 for arithmetical combination with the cumulative $y\Delta x$ value stored in the channel 14 for the integrator. Since $Y_a'$ is negative, only a negative overflow can occur in the cumulative $y\Delta x$ value for the integrator when the value of $Y_a'$ is arithmetically combined with the cumulative $y\Delta x$ value for the integrator.

As previously disclosed, a full indication of a positive number representing the cumulative $y\Delta x$ value for an integrator is obtained by a pulse of relatively high voltage for each pulse position in the channel 14 for the integrator. This corresponds to the representation of the integer "1" for each pulse position in the channel 14 for the integrator. Because of the binary presentation of numbers in the channel 14, a negative number of maximum absolute magnitude for an integrator is represented by a pulse of relative low voltage in each pulse position for the integrator in the channel 14. This corresponds to an indication of the integer "0" for each pulse position in the channel 14 for the integrator.

Since a negative overflow in the channel 14 is obtained for an integrator when the integrator has a negative value represented by $Y_a'$, the overflow can occur only after a pulse of low voltage has appeared in each information position in the channel 14 for the integrator upon the presentation of the integrator for computation. Upon a negative overflow in the channel 14 for an integrator, the indications in the channel 14 for the integrator return to a relatively high intensity for each pulse position to indicate the integer "1" for each position. Subsequent additions of the negative $Y_a'$ indications for an integrator cause the indications in the channel 14 for the integrator to increase in magnitude. An increase in magnitude in a negative direction is obtained by progressively changing the pulse indications of high intensity to pulse indications of low intensity for pulse positions of increasing numerical significance.

For example, a decimal value of —596 may be indicated in binary form in the channel 14 for a particular integrator. If the maximum negative indication that can be provided as the cumulative $y\Delta x$ value for the integrator is 600, the arithmetical combination of the value of —596 and a value of —5 representing the $Y_a'$ value for the integrator causes a negative overflow to be obtained. At the same time, the circuit 128 provides a carry from the 47th pulse position to the 48th pulse position for the particular integrator to indicate that a negative overflow has occurred in the cumulative $y\Delta x$ value for the integrator. Since the overflow is negative, the circuit 128 provides an indication of the overflow by a pulse of relatively low intensity at the 48th pulse position. This corresponds to the value $D_2'$ for pulse position 48 of the integrator.

A signal passing through the gate circuit 152 at pulse position 48 for an integrator provides an indication that an overflow has occurred. The polarity of such an overflow for an integrator is determined by the presence or absence of a coding pulse in the channel 14 in pulse position 48 for the integrator. The presence of a coding pulse in pulse position 48 for an integrator indicates that the cumulative $y\Delta x$ value stored in the channel 14 for the integrator is to be inverted in polarity. The presence of such a coding pulse is indicated by a relatively high voltage on the plate of the left tube in the multivibrator 56 at pulse position 48 for the integrator.

When a pulse is produced by the gate circuit 152 at pulse position 48 for an integrator and a pulse of relatively high voltage is simultaneously produced on the plate of the left tube in the multivibrator 56, a signal passes through the gate circuit 160. This signal indicates that the pulse passing through the gate circuit 152 represents a positive overflow in the cumulative $y\Delta x$ value for the integrator. A positive overflow is obtained because the coding pulse in the channel 14 in pulse position 48 for the integrator causes the polarity of the overflow pulse passing through the gate circuit 152 to be inverted. Since the pulse passing through the gate circuit 152 indicates a negative overflow, the inversion of such a negative overflow by the gate circuit 160 causes the gate circuit to indicate a positive overflow.

When a pulse passes through the gate circuit 160 to indicate a positive overflow for an integrator, it is introduced to the coil 44 after passing through the "or" networks 162 and 92. The pulse is then recorded in the channel 20 to indicate that the overflow pulse simultaneously recorded in the channel 18 is positive. In this way, the gate circuit 160 operates in a manner similar to the gate circuit 158 to indicate a positive overflow.

The operation of the gate circuit 146 may be indicated by the logical equation $Z_t=TD_2Y_aP_{48}$. In the above equation, T indicates a relatively high voltage on the plate of the left tube in the multivibrator 140 and $P_{48}$ indicates pulse position 48 of each integrator. $Z_t$ indicates that a magnetic pulse of relatively high intensity is recorded in the channel 18. Similarly, the operation of the gate circuit 152 is indicated by the logical equation $Z_t=TD_2'Y_a'P_{48}$.

The logical equation for the operation of the gate circuit 158 may be indicated as $Z_s=(TD_2Y_aP_{48})(R_1')$, where $Z_s$ indicates that a magnetic pulse of relatively high intensity is recorded in the channel 20. Similarly, the logical equation for the operation of the gate circuit 160 is indicated by the equation $Z_s=(TD_2'Y_a'P_{48})(R_1)$.

As previously disclosed, the coils 38 and 44 are effectively separated by 49 pulse positions from the coils 40 and 46, respectively. Since the length of each integrator is only 48 positions, a precessing action occurs in the channels 18 and 20. This precessing action causes a pulse position to be made available in each of the channels 18 and 20 so that the overflow information for the cumulative $y\Delta x$ value in the 48th pulse position for each integrator can be recorded after the computation has been made for the integrator. This may be seen in the chart shown in Figure 8.

In all of the vertical columns in the chart shown in Figure 8 except for the two at the extreme right, numbers between "1" and "22" are shown corresponding to the 22 integrators in the digital differential analzer. In the two vertical columns at the extreme right, numbers are shown prefaced by the letters "I" and "P." The letter "I" followed by a number indicates the particular integrator that is moving past the coils 38 and 44 at any instant. For example, "$I_3$" indicates that a pulse position in the third integrator is moving past the coils 38 and 44. Similarly, a designation such as "$P_{13}$" indicates that the 13th pulse position in the particular integrator is moving past the coils 38 and 44.

Since the operation of the channel 20 is similar to that of the channel 18, the following discussion will be limited to the channel 18. As will be seen at 250 in Figure 8, a first pulse of relatively high voltage may be provided in the channel 18 at the 48th position of Integrator "1." This pulse indicates that an overflow has occurred in the cumulative $y\Delta x$ value stored in the channel 14 for the integrator but the pulse does not indicate whether the overflow is positive or negative. The pulse 250 advances from the coil 38 towards the coil 40 as the drum 10 rotates through the 48 positions of Integrator "2." At the 48th position of Integrator "2," a pulse of relatively high voltage may be recorded by the coil 38 to indicate an overflow from Integrator "2," as shown at 252 in Figure 8. At the $P_1I_3$ position, the indication 250 passes through the gate circuit 80 and the "or" network 90 to the coil 38. This pulse is again recorded by the coil 38 in the channel 18, this time at the pulse position adjacent to the indication 252.

Similarly, indications are provided in adjacent pulse positions to show whether or not an overflow has occurred in the cumulative $y\Delta x$ value for each of the other integrators in the analyzer. These indications are recirculated by the gate circuit 80, which remains open during the first 47 pulse positions of each integrator. At the 48th position for each integrator, the gate circuit 80 closes and prevents any recirculation of old information. At the same time as the gate circuit 80 closes, the overflow information for the integrator moving past the coil 38 is recorded in the channel 18. In this way, old overflow information for an integrator is replaced by new overflow information for the integrator every time that the integrator is presented for computation.

After the indications have been provided in the channel 18 for the 48th pulse position of each integrator, Integrator "1" becomes available for computation a second time. As the drum rotates through the first 22 positions for the integrator, the output indications for the 22 integrators move in sequence past the coil 40. This causes the output indications in the channel 18 to become available for determining whether or not a $\Delta x$ increment and $\Delta y$ increments are actually obtained for the integrator during the second computation. The determination of the occurrence of an actual $\Delta x$ increment and of actual $\Delta y$ increments is made by respectively comparing the coding pulses in the channels 14 and 16 with the coding pulses in the channel 18. The operation of the digital differential analyzer to obtain such a determination has been previously disclosed in detail.

In like manner, the pulse indications in the channel 18 representing the overflow indications for the different integrators are made available to each integrator as it is presented for computation. The overflow indications in the channel 20 are also made available to each integrator as it is presented for computation so that a determination can be made as to whether each actual $\Delta x$ increment is positive or negative and so that a similar determination can be made as to the polarity of each $\Delta y$ increment.

The digital differential analyzer disclosed above has several important advantages. By determining whether or not an overflow in the cumulative $y\Delta x$ value has occurred for each integrator and determining the polarity of each such overflow, a ternary indication of +1, 0 or −1 is obtained for the cumulative $y\Delta x$ value for each integrator every time that the integrator is presented for computation. Because of this ternary indication, the digital differential analyzer is able to provide a determination on a ternary basis as to whether each $\Delta x$ increment is +1, 0 or −1. A similar ternary indication is also provided by the analyzer for each $\Delta y$ increment. Since $\Delta x$ and $\Delta y$ increments for an integrator can be determined to be 0 as well as +1 and −1, true values of the independent quantity $x$ and the dependent quantity $y$ for each integrator can be obtained at all times. This causes the accuracy of the digital differential analyzer disclosed above to be enhanced over that obtained from analyzers now in use.

It should be appreciated that a system of ternary transfer similar to that disclosed above can be incorporated in other digital differential analyzers than that disclosed in copending application Serial No. 217,478. For example, the system of ternary transfer disclosed above can be easily adapted for use with the digital differential analyzer disclosed in co-pending application Serial No. 263,152, filed December 26, 1951 by Glenn E. Hagen et al.

It should be appreciated that the term "signal indications" as used in the claims refers to physical phenomena which take place in the digital differential analyzer, as for example, the production of electrical signals. The term "differential combination" as used in the claims refers to the combination of the dependent quantity $y$ and the increments $\Delta x$ in the independent quantity to obtain the output quantity represented by the $y\Delta x$ increments.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A digital differential analyzer, including, a plurality of integrator storage sections, means for providing digital signal indications alternatively representing: a positive increment, a negative increment, or no increment in an independent quantity from each integrator storage section, means for providing digital signal indications representing a dependent quantity from each integrator storage section, and means for combining the signal indications representing the dependent quantity and variations in the independent quantity from each integrator storage section upon the occurrence of digital variations in the independent quantity for the integrator storage section and in accordance with the polarity of such occurrences to provide signal indications representing the differential combination of the integrator storage section.

2. A digital differential analyzer, including a plurality of integrator storage sections, means for providing digital signal indications capable of representing: a discrete positive variation, a discrete negative variation, or no variation in an independent quantity from each integrator storage section, means for providing digital signal indications representing a dependent quantity from each integrator storage section, transfer means for transferring the signal indications representing the dependent quantity from an integrator storage section under control of said digital signal indications representing variations in the independent quantity, means for providing digital signal indications representing a differential combination from each integrator storage section, and means for combining the signal indications representing the dependent quantity and the differential combination from an integrator storage section upon the transfer of the signal indications representing the dependent quantity from said transfer means, to thereby provide signal indications digitally representing a new value of the differential combination.

3. A digital differential analyzer, including a plurality of integrator storage sections, means for providing digital signal indications capable of representing: a discrete positive variation, a discrete negative variation, or no variation in an independent quantity from an integrator storage section, means for providing signal indications digitally representing a dependent quantity from an integrator storage section, means for providing for the transfer of the signal indications representing the dependent quantity upon the occurrence of digital variations in the independent quantity, means for providing digital signal indications representing the cumulative value of a differential combination from an integrator storage section, means for combining the signal indications representing the dependent quantity and the differential combination upon transfer of the signal indications representing the dependent quantity from an integrator storage section to thereby produce signal indications digitally representing a new cumulative value of the differential combination, and means for registering the signal indications representing the cumulative value of the differential combination.

4. A digital differential analyzer, including, a plurality of integrator storage sections, electrical circuitry for providing digital signal indications capable of representing: a discrete positive variation, a discrete negative variation, or no variation in an independent quantity from each integrator storage section, electrical circuitry for providing digital signal indications representing the polarity of variations in an independent quantity from each integrator storage section, electrical circuitry for providing digital signal indications representing a dependent quantity from each integrator storage section, electrical circuitry for transferring the digital signal indications representing the dependent quantity from each integrator storage section upon the occurrence of digital variations in the independent quantity from an integrator storage section, electrical circuitry for combining the signal indications representing the dependent quantity and the differential combination from an integrator storage section upon a transfer of the signal indications representing the dependent quantity from an integrator storage section, and in accordance with the signal indications representing the polarity of the digital variations in the independent quantity from an integrator storage section to produce signal indications representing a new cumulative value of the differential combination, and electrical circuitry for registering the signal indications representing the differential combination in an integrator storage section.

5. A differential analyzer comprising: a recording means; means for defining said recording means into a plurality of integrator storage sections; sensing means for sensing said recording means; means for scanning said recording means with said sensing means to thereby derive a plurality of digital signal indications from each of said integrator storage sections including: a signal indications alternatively representing a positive increment, a negative increment or no increment, in an independent quantity, signal indications representing a dependent quantity, and signal indications representing an accumulated value of the different combination of increments in said independent quantity and said dependent quantity; means for differentially combining said signal indications representing an increment in an independent quantity and said signal indications representing a dependent quantity to form new differential combination signal indications; and means for algebraically combining said new differential combination signal indications and said signal indications representing an accumulated value of the differential combinations.

6. A differential analyzer comprising: a recording means; means for defining said recording means into a plurality of integrator storage sections; sensing means for sensing said recording means; means for scanning said recording means with said sensing means to thereby derive a plurality of digital signal indications from each of said integrator storage sections including: signal indications alternatively representing a positive increment, a negative increment, or no increment in an independent quantity, signal indications alternatively representing an increment or no increment in a dependent quantity, signal indications representing an accumulated dependent quantity, and signal indications representing an accumulated value of the differential combination of increments in said independent quantity and said dependent quantity; means for algebraically combining said increments in a dependent quantity and said accumulated dependent quantity to form signal indications representing a new dependent quantity; means for differentially combining said signal indications representing an increment in an independent quantity and said signal indications representing a new dependent quantity to form new differential combination signal indications; and means for algebraically combining said new differential combination signal indications and said signal indications representing an accumulated value of the differential combinations.

7. A differential analyzer comprising: a recording means; means for defining said recording means into a plurality of integrator storage sections; sensing means for sensing said recording means; means for scanning said recording means with said sensing means to thereby derive a plurality of digital signal indications from each of said integrator storage sections including: signal indications alternatively representing a positive increment, a negative increment, or no increment in an independent quantity, signal indications representing a dependent quantity, and signal indications representing an accumulated value of the differential combination of increments in said independent quantity and said dependent quantity; means for differentially combining said signal indications representing an increment in an independent quantity and said signal indications representing a dependent quantity to form new differential combination signal indications; means for algebraically combining said new differential combination signal indications and said signal indications representing an accumulated value of the differential combinations to thereby form signal indications representing a new accumulated value of the differential combinations; and means for re-registering said signal indications representing a dependent quantity and said signal indications representing an accumulated value of the differential combination in said recording means.

8. A differential analyzer comprising: recording means for recording digital signals; means for defining said recording means into a plurality of integrator storage sections; sensing means for sensing said recording means; means for scanning said recording means with said sensing means to thereby derive a plurality of digital signal indications from each of said integrator storage sections including: signal indications alternatively representing a positive increment, a negative increment or no increment in an independent quantity, signal indications representing a dependent quantity, and signal indications representing an accumulated value of the differential combination of increments in said independent quantity and said dependent quantity; means for differentially combining said signal indications representing an increment in an independent quantity and said singal indications representing a dependent quantity to form new differential combination signal indications; and means for algebraically combining said new differential combination signal indications and said signal indications representing an accumulated value of the differential combinations.

9. A digital differential analyzer including: a plurality of integrator storage sections; means for providing digital signal indications from each of said integrator storage sections representing a dependent quantity; means for providing digital signal indications from each of said integrator storage sections representing an accumulated differential combination of a dependent quantity and increments in an independent quantity; means for providing digital signal indications from each of said integrator storage sections capable of representing positive increments, negative increments and no increment in an independent quantity; means for differentially combining said signal indications representing a dependent quantity and said increments in an independent quantity, to form signals representing an incremental differential combination; and means for algebraically combining said signals representing an incremental differential combination and said signals representing an accumulated differential combination.

10. A digital differential analyzer including: a plurality of integrator storage sections; means for providing digital signal indications from each of said integrator storage sections representing a dependent quantity; means for providing digital signal indications from each of said integrator storage sections representing variations and no variation in a dependent quantity; means for altering said signal indications representing a dependent quantity according to said signal indications representing variations in a dependent quantity; means for providing digital signal indications from each of said integrator storage sections representing an accumulated differential combination of a dependent quantity and increments in an independent quantity; means for providing digital signal indications from each of said integrator storage sections capable of representing positive increments, negative increments and no increment in an independent quantity; means for differentially combining said signal indications representing a dependent quantity and said increments in an independent quantity, to form signals representing an incremental differential combination; and means for algebraically combining said signals representing an incremental differential combination and said signals representing an accumulated differential combination.

References Cited in the file of this patent

UNITED STATES PATENTS

| | | |
|---|---|---|
| 2,609,143 | Stibitz | Sept. 2, 1952 |
| 2,674,733 | Robbins | Apr. 6, 1954 |
| 2,679,035 | Daniels | May 18, 1954 |
| 2,700,696 | Barker | Jan. 25, 1955 |
| 2,701,095 | Stibitz | Feb. 1, 1955 |
| 2,737,342 | Nelson | Mar. 6, 1956 |
| 2,749,037 | Stibitz | June 5, 1956 |
| 2,841,328 | Steele et al. | July 1, 1958 |
| 2,850,232 | Hagen et al. | Sept. 2, 1958 |
| 2,852,187 | Beck | Sept. 16, 1958 |

OTHER REFERENCES

A New Type of Differential Analyzer, by V. Bush et al.: Journal of the Franklin Institute, volume 240, No. 4, October 1945, pages 255–326.

Fundamental Concepts of the Digital Differential Analyzer Method of Computation, R. E. Sprague, Mathematical Tables and Other Aids to Computation, volume 6, January 1952, pages 41–49 only.

The Serial-Memory Digital Differential Analyzer, J. F. Donan, Mathematical Tables and Other Aids to Computation, volume 6, April 1952; pages 102–112 only.